3,085,108
PROCESS FOR PREPARING ESTERS FROM TERTIARY OLEFINS
William D. Stepanek, Beacon, N.Y., assignor to Texaco Inc., New York, N.Y., a corporation of Delaware
No Drawing. Filed May 31, 1960, Ser. No. 32,585
8 Claims. (Cl. 260—497)

The subject invention relates to a process for preparing t-alkyl esters of carboxylic acid. More particularly it relates to a process for pretreating a period 3 polyvalent metal silicate catalyst employed in the manufacture of t-alkyl esters from tertiary olefins and carboxylic acids with the result that a substantial improvement in yield of t-alkyl ester is obtained.

In the commonly-assigned copending application Serial No. 801,434, filed March 24, 1959, in the names of R. Y. Heisler, H. V. Hess, G. W. Eckert and M. C. Throckmorton, there is disclosed a process for preparing t-alkyl esters of carboxylic acids in a liquid phase reaction employing a solid catalyst broadly described as a period 3 polyvalent metal silicate. Both synthetic and naturally-occurring period 3 polyvalent metal silicate catalysts, which are exemplified by silica-alumina and silica-magnesia cracking catalysts, are effective in directing the reaction between carboxylic acids and tertiary olefins to form t-alkyl esters. The process of the present invention involves the discovery that pretreatment of the period 3 polyvalent metal silicate prior to its use in the ester-forming reaction with a monocarboxylic acid such as acetic acid results in a substantial improvement in catalyst yield.

The present invention involves a process for pretreating period 3 polyvalent metal silicate catalysts prior to their use in the ester-forming reaction with a $C_2$–$C_8$ monocarboxylic acid in the liquid phase at a temperature over 150° F. for a period of at least 2 hours. Pretreatment of the catalyst with acid in this manner results in a significant increase in the yield of t-alkyl ester when the pretreated catalyst is employed in the ester-forming reaction.

The synthesis of t-alkyl esters of monocarboxylic acids has recently assumed substantial importance with the announcement by applicant's assignee that t-alkyl esters of monocarboxylic acids such as t-butyl acetate act as octane appreciators for leaded gasolines. The period 3 polyvalent metal silicate catalysts disclosed in the afore-identified copending application represent a significant advance in the synthesis of t-alkyl esters by the reaction of tertiary olefins with carboxylic acids because of their high degree of specificity and because the resulting reaction product is free from inorganic acids.

The liquid phase reaction of tertiary olefins with carboxylic acids employing period 3 polyvalent metal silicate catalysts is effected at a temperature between 100 and 300° F. and at a pressure sufficient to maintain liquid phase operation which usually falls between 25 and 500 p.s.i.g. Since the reaction is advantageously effected in a continuous manner by passing the reactants through a fixed bed of the catalyst, space velocities between 0.1 and 5.0 liquid volumes of feed reactants per bulk volume of catalyst per hour are employed with the preferred space velocities falling in a range from 0.25 to 2.0 v./v./hr.

The tertiary olefin reactant is an olefinic hydrocarbon in which at least one of the carbon atoms forming the olefinic bond is completely substituted with carbon atoms, or stated another way, in which at least one of the double-bonded carbon atoms is devoid of a hydrogen substituent. The most common tertiary olefins are those in the aliphatic series containing 4–18 carbon atoms. Examples of these tertiary olefins are isobutylene, 2-methyl-2-butene, 2-methyl-2-pentene, 2-methyl-1-butylene and 3-methyl-3-octene. Cyclo-aliphatic tertiary olefinic compounds such as 1-methyl-1-cyclohexene are also usable in the process of the invention for preparing tertiary esters. The tertiary olefins most commonly employed to prepare t-alkyl esters by reaction with carboxylic acid in the presence of a period 3 polyvalent metal silicate catalyst are isobutylene, 2-methyl-1-butene and 2-methyl-2-butene.

The carboxylic acid reactant employed in the formation of t-alkyl esters using a period 3 polyvalent metal silicate catalyst is normally a hydrocarbyl monocarboxylic acid containing 1–20 carbon atoms and usually containing 1–12 carbon atoms. Polybasic acids containing 2 or more carboxylic acid radicals and 2 to 12 or more carbon atoms may also be employed to form t-alkyl esters. The carboxylic acid reactant can also contain non-reactive substituents in the place of the hydrogen atom in the hydrocarbon skeleton, for example, keto radicals, nitrile radicals, halogen atoms, alkoxy radicals and sulfhydryl radicals can be present on the carbon skeleton of the carboxylic acid. Effective carboxylic acids for preparing t-alkyl esters employing a period 3 polyvalent metal silicate catalyst are exemplified by the following: Acetic acid, malonic acid, propionic acid, butyric acid, valeric acid, 2-ethylhexanoic acid, benzoic acid, cyclohexane carboxylic acid, maleic acid, sebacic acid and adipic acid.

The period 3 polyvalent metal silicate catalyst employed in the formation of t-alkyl esters comprises from about 5–50 weight percent of period 3 metal oxides with the remainder comprising silica. Magnesium silicate and aluminum silicate or mixtures of these two materials are normally employed in the t-alkyl ester-forming reaction. In silica-alumina catalysts, the alumina content ordinarily ranges from 9 to about 25% and in silica-magnesia catalysts the magnesia content normally falls between 20–30 weight percent.

Period 3 polyvalent metal silicate catalysts used in the formation of t-alkyl esters are either of the synthetic variety or are naturally-occurring clays or zeolites comprising mainly period 3 polyvalent metal oxide and silica.

The period 3 polyvalent metal silicates can also contain 1–20 weight percent of the following metal oxides as promoters: Iron oxide, titanium oxide, thorium oxide, boron oxide, zirconium oxide and mixtures of the same. The usual concentration of these promoters falls in the range of 0.5–5.0 weight percent of the period 3 polyvalent metal silicate catalysts.

In the activation process of this invention, the monocarboxylic acid used to pretreat the period 3 polyvalent metal silicate catalyst is a hydrocarbyl monocarboxylic acid containing 2–8 carbon atoms. Acids which have a promotional effect upon the activity of the period 3 polyvalent metal silicate catalysts are exemplified by the following: Acetic acid, propionic acid, butyric acid, isobutyric acid, valeric acid, isovaleric acid, caproic acid, heptanoic acid and caprylic acid. The preferred material for pretreating the period 3 polyvalent metal silicate catalyst is acetic acid because of its greater availability and lower cost than the other acids in the $C_2$–$C_8$ group of monocarboxylic acids. Propionic acid is the next preferred material for the pretreatment.

The activation pretreatment is effected at the temperature above 150° F. up to the boiling point of the acid employed. The upper limit is set by the requirement of effecting pretreatment of the catalyst in the liquid phase. The pretreatment is normally effected at a temperature of 175–275° F.

A minimum period of about 2 hours is prescribed for the acid pretreatment with periods of 10–30 hours being recommended to obtain the optimum improvement in catalyst activity as measured by the yield of t-alkyl ester.

Although the liquid phase pretreatment of the period 3 polyvalent metal silicate catalyst with acetic or other hydrocarbyl monocarboxylic acid containing up to 8 carbon atoms can be effected under static conditions, that is, by soaking the catalyst with the acid, it is recommended that the pretreatment be effected continuously, that is by slowly passing the acid through a fixed bed of the period 3 polyvalent metal silicate catalyst. In the continuous pretreatment, space velocities between 0.1 and 1.5 liquid volumes of monocarboxylic acid per bulk volume of catalyst per hour are used. The preferred space velocities for pretreatment of the period 3 polyvalent metal silicate catalyst are in the range of 0.2–0.7 volumes of acid per volume of catalyst per hour.

The pretreatment of the catalyst with the monocarboxylic acid is normally effected at atmospheric pressure although both sub-atmospheric and super-atmospheric pressures up to about 200 p.s.i.g. and higher may be employed. Since no advantages accrue from employing either vacuum or super-atmospheric pressure during the pretreatment, it is normally effected at atmospheric pressure.

The pretreatment process of this invention for improving the catalytic activity of period 3 polyvalent metal silicates in the formation of t-alkyl esters is illustrated in the following examples:

*Example 1*

A fresh silica-magnesia cracking catalyst containing 25% magnesium oxide in the form of 3/16" pellets which have been calcined at 1000° F. was evaluated as a catalyst in the formation of t-butyl acetate by the reaction of isobutylene with acetic acid. Isobutylene and acetic acid in a mol ratio of 0.5 mol of olefin per mol of acetic acid were passed through the catalyst at a space velocity of 0.5 volume of feed per volume of catalyst per hour. The reaction was effected at a temperature of 150° F. and a pressure of 200 p.s.i.g. The yield of t-butyl acetate was 38 percent on a mol basis and 74.7 lbs. per barrel of feed. In this and the following examples, the yield is calculated basis the minor component.

*Example 2*

In this example, a silica-magnesia catalyst of the composition employed in Example 1 was subjected to an activation treatment comprising passing acetic acid through the catalyst bed at a temperature of 200° F. for a period of 25 hours and at a space velocity of 0.5 volume of acetic acid per volume of catalyst per hour. Subsequent to the activation treatment, the catalyst was employed in the t-butyl acetate-forming reaction employing the same conditions employed in Example 1. Isobutylene and acetic acid in a mol ratio of olefin to acid of 0.5 were charged at a space velocity of 0.5 volume of feed per volume of catalyst per hour to the catalyst-containing reaction zone maintained at 150° F. and 200 p.s.i.g. The yield of t-butyl acetate obtained with the activated catalyst was 48.2 percent on a mol basis and 94.5 lbs. per bbl. of feed. The activation treatment increased the yield of t-butyl acetate by 10 mol percent and by approximately 20 lbs. per bbl. of feed.

*Example 3*

A silica-magnesia cracking catalyst having the composition shown in Example 1 was employed as a catalyst for the t-butyl acetate-forming reaction using an excess of the isobutylene reactant. A mol ratio of isobutylene to acetic acid of 1.8 was employed. The temperature, pressure and space velocity were the same as used in Example 1, namely 150° F., 200 p.s.i.g. and 0.5 v./v./hr. The t-butyl acetate was 39.4 percent on a mol basis and 71.5 lbs. per bbl. of feed.

*Example 4*

A silica-magnesia catalyst of similar composition was activated by the same procedure outlined in Example 2, i.e. by passing acetic acid therethrough for 25 hours at a temperature of 200° F. and at a space velocity of 0.5 v./v./hr. When the activated catalyst was employed in the t-butyl acetate-forming reaction at essentially the same reaction conditions employed in Example 3 (the only difference being an immaterial increase in the mol ratio of olefin to acid to 2.0), the yield of t-butyl acetate was 49.8 percent on a mol basis and 84 lbs. per bbl. of feed. The acid pretreatment resulted in approximately 10 mol percent increase in t-butyl acetate yield.

Obviously, many modifications and variations of the invention as hereinbefore set forth may be made without departing from the spirit and scope thereof and, therefore, only such limitations should be imposed as are indicated in the appended claims.

I claim:

1. In a process for preparing tertiary esters of carboxylic acids by a liquid phase reaction of tertiary olefins with a carboxylic acid in the presence of a period 3 polyvalent metal silicate catalyst consisting mainly of silica and 5 to 50 weight percent period 3 polyvalent metal oxide, the improvement which comprises pretreating said period 3 polyvalent metal silicate catalyst in the liquid phase with an aliphatic hydrocarbyl monocarboxylic acid containing 2–8 carbon atoms at a temperature over 150° F. for a period of at least 2 hours prior to use of said catalyst in said ester-forming reaction.

2. The improvement according to claim 1 in which pretreatment of said period 3 polyvalent metal silicate catalyst with said monocarboxylic acid is effected at a temperature between 175 and 275° F.

3. The improvement according to claim 1 in which pretreatment of said period 3 polyvalent metal silicate catalyst with said monocarboxylic acid is effected for a period of 10–30 hours.

4. The improvement according to claim 1 in which pretreatment of said period 3 polyvalent metal silicate catalyst is effected by soaking with said monocarboxylic acid.

5. The improvement according to claim 1 in which said pretreatment is effected continuously by passing said monocarboxylic acid through said period 3 polyvalent metal silicate catalyst at a space velocity between 0.1 and 1.5 volumes of acid per bulk volume of catalyst per hour.

6. The improvement according to claim 1 in which said pretreatment is effected with acetic acid.

7. The improvement according to claim 1 in which said pretreatment is effected wtih propionic acid.

8. The imrovement according to claim 1 in which said period 3 polyvalent metal silicate catalyst consist mainly of silica and 5–50 weight percent magnesia.

References Cited in the file of this patent

UNITED STATES PATENTS 2,525,145    Movity _____ Oct. 10, 1950
2,678,332    Cottle _____ May 1, 1954